Aug. 1, 1961     R. J. PIERCE     2,994,867
COLLISION AVOIDANCE PRESENTATION SYSTEM
Filed Feb. 2, 1959     9 Sheets-Sheet 1

INVENTOR.
ROGER J. PIERCE
BY
ATTORNEY
AGENT

INVENTOR.
ROGER J. PIERCE
BY
ATTORNEY
AGENT

INVENTOR.
ROGER J. PIERCE
BY
ATTORNEY
AGENT

2,994,867
COLLISION AVOIDANCE PRESENTATION SYSTEM
Roger J. Pierce, Cedar Rapids, Iowa, assignor to Collins Radio Company, Cedar Rapids, Iowa, a corporation of Iowa
Filed Feb. 2, 1959, Ser. No. 790,467
10 Claims. (Cl. 343—9)

This invention relates generally to the prevention of aircraft collision by electronic means and more particularly to a philosophy and suggested embodiment of a collision avoidance system of the uncooperative type by which a pilot may detect impending collision, be presented with a suggestion for evasive action and be informed of the effect of his evasive action.

The increasing number of commercial and military aircraft in the skies and their ever increasing speed makes it mandatory that a system of collision avoidance be integrated into each aircraft so that it can "see" potential objects in time to take evasive action to prevent collision. A successful collision avoidance system, in addition to warning the pilot of the presence of an intruding aircraft, must include means for suggested evasive action and should further inform the pilot as to the results of his evasive action.

Avoidance systems have been proposed wherein the pilot is informed by a visual or aural warning device that another aircraft is in his vicinity and that he must alter his present flight situation in order to avoid a possible collision. Generally, such systems unsuccessfully solve the collision problem since they do not present an accurate picture to the pilot of the relative position of the protruding aircraft and its motion relative to his own. The present invention therefore is based upon the philosophy that collision avoidance may be more successfully achieved when the pilot's basic senses are employed as compared to systems which function purely as "robot" warning devices to merely warn the pilot that collision is imminent, but present him with no command by which he may grasp the situation and take evasive action. The present invention outlines a collision avoidance system based upon the use of the pilot's intelligence coupled with electronic enhancement of his sense of sight. This enhancement is realized by a cockpit presentation instrument supplied with electronic data which displays an intruder on the screen of the instrument in much the same fashion as if it were a true visual situation display. This permits the pilot to react in accordance with normal visual habits to avoid collision.

The system of this invention is based upon the philosophy that the pilot of an airplane when given sufficient information, properly presented, and in adequate time, can steer his airplane to avoid collision. The pilot in combination with the electronic exultation of his normal senses can perform more successfully than presently conceived automatic or robot systems for collision avoidance.

The present system is concerned mainly with enhancing the pilot's sense of vision. The pilot should be able to see in all directions a fast moving object at long distances. He should be able to note by the object's size whether it is receding or approaching. He should be able to determine its angle with respect to his heading. He should be able to determine its angular rate of change with respect to his heading. He should be able to note all these things constantly so that he can make continuous appraisal of whether the object represents a collision threat. He should be able to determine from the presentation the point at which a threat occurs in time to take proper evasive action. He should be able to observe the effect of his maneuver to see if it has improved the situation and has eliminated collision threat.

It is an object, therefore, of the present invention to provide a presentation which will convey the above necessary information to the pilot and thereby achieve the optimum relationship between the pilot and his aircraft and permit the pilot to steer his aircraft in keeping with his normal visual habits, thus efficiently using the pilot's intelligence.

The invention is featured in the "conversion" of the pilot's own craft and all detected aircraft to imaginary bicones with a predetermined height and base diameter whereby the problem of collision prevention is reduced to that of prevention of the collision of two such bicones with each craft in the center of the bicones.

It is a further feature of this invention to present an intruder on a cathode ray screen as a circle which represents the base of its imaginary bicone whereby the size of the base or circle varies with the intruder distance from the pilot's aircraft. A reference circle of fixed size on the screen indicates to the pilot the imaginary extension of the boundaries of his aircraft to the base of his bicone which is a predetermined distance ahead and behind. When the size of the intruder circle is equal to the size of the reference circle, there is a "collision of bicones." This situation represents twice the cone height between the pilot's aircraft and the intruder and the invention therefore features a margin of safety since the above mentioned "collision of bicones" would be avoided by a wide margin.

A further object of the present invention is the provision of means whereby the pilot may observe the relative motion of the intruder at long distances by means of "electronic magnification" of the intruder circle.

A still further object is the provision of means in conjunction with the electronic magnification feature whereby the pilot may observe the angular rate of change of the intruder with respect to his own heading.

These and other objects and features of the present invention will become apparent from the following description and claims in conjunction with the accompanying drawings, in which:

As stated above, the system to be described exalts the senses of the pilot to enable him to cope with the collision situation. In addition to this electronic enhancement of encounter data, a novel concept according to the present invention is the imaginary extension of the boundaries of the aircraft to permit the pilot to visualize avoidance of collision of two very large objects many times the dimensions of his own aircraft. The imaginary boundary extension of aircraft according to the present invention permits some latitude for pilot error and reduces the accuracy requirements for an evasive maneuver by a predetermined, arbitrarily selected margin of error.

While a number of configurations might be chosen as imaginary extension of aircraft boundaries in accordance with the philosophy of this invention, one choice which lends itself most readily to an analogous display is that of the bicones previously referred to. From the standpoint of one's imagination, perhaps the simplest imaginary extension of boundaries would be that of considering the aircraft to be enclosed at the center of a sphere whose radius is, for example, one thousand feet. In this case, the intruding aircraft would perhaps be represented as a sphere of one thousand feet radius and the presentation system would tell the pilot of a "sphere two thousand feet in diameter" how to miss a "sphere two thousand feet in diameter." Thus if there were some error in the pilot's judgment, a margin of safety would remain since a glancing collision of the "spheres" would leave the actual aircraft unscathed.

Since imaginary extension as a sphere would be difficult to present in terms easily visualized by the pilot, and since a primary object of the present invention is to give the pilot as nearly as possible a true visual presentation, the form proposed herein is that of a bicone projecting one thousand feet ahead and behind the aircraft and eight hundred feet in diameter. It is to be emphasized that this choice of dimensions is arbitrary and by way of example only. Other dimensions might equally suit the purpose. Obviously, the dimensions of the bicone would be tailored to present desired safety margins in accordance with nominal aircraft velocities, etc. The concept to be described herein then converts all aircraft to imaginary bicones of the above-stated dimensions. This form is one which might be easily visualized by the pilot in the proposed presentation system, a description of which follows.

Figures 1, 2, 12:
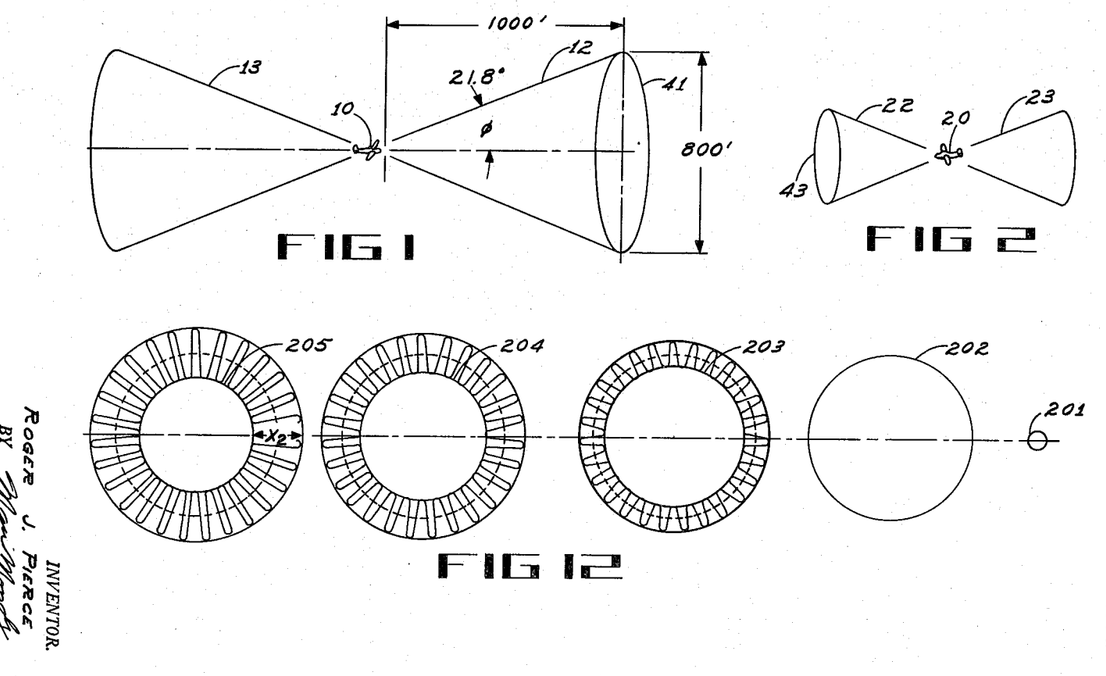
FIGURE 1 illustrates an aircraft with boundaries extended into an imaginary bicone according to the philosophy of the present invention.
FIGURE 2 illustrates an intruding aircraft with dimensions similarly extended into an imaginary bicone.
FIGURE 12 is a diagram illustrating the electronic presentation of angular rate of change data according to the present invention.

The proposed imaginary extension of aircraft dimensions into the above discussed bicone configurations is illustrated in FIGURES 1 and 2. The form is that of a bicone one thousand feet ahead and behind an aircraft 10 forming two cone configurations 12 and 13 having bases of eight hundred feet. The half-angle $\phi$ of the bicone configuration is thus, from the geometry of the situation, seen to be equal to 21.8°. Were one to consider the aircraft 10 of FIGURE 1 his aircraft, all other aircraft regardless of whether they carry the present invention or not would likewise be represented as having a similar bicone configuration extending their dimension. FIGURE 2 might represent such an intruder wherein the conical configurations 22 and 23 extend from the aircraft 20.

Figure 4:
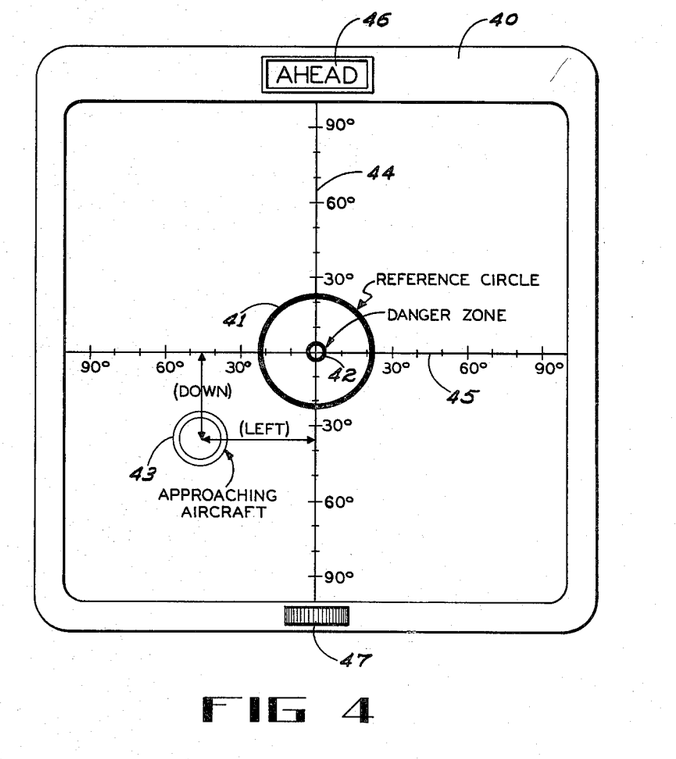
FIGURE 4 is a view of a panel instrument presenting the collision avoidance information to the pilot according to the present invention.

The presentation system of the invention will be first discussed. With reference to FIGURE 4, a panel instrument generally designated by reference numeral 40 presents the required information to the pilot. The instrument 40 is an oscilloscope screen which displays the front or rear hemispheres with respect to the aircraft carrying the presentation instrument. In accordance with the present invention, the center of the screen is the heading of the aircraft. The screen reference lines 44 and 45 are calibrated into degrees up and down and right and left respectively. The extension of the imaginary cone of the aircraft 10 of FIGURE 1 would be represented by a circle 41 whose radius defines a half-angle $\phi$ equal to 21.8° in accordance with the geometry of FIGURE 1. Thus the reference circle 41 of FIGURE 4 represents the base 41 of the extended cone illustrated geometrically in FIGURE 1. It is noted that the screen reference lines 44 and 45 of the instrument of FIGURE 4 are calibrated in degrees with respect to the heading of the aircraft from 0° at the center to 90° left, right, up and down. The base 41 of the bicone of the aircraft is accordingly illustrated as the reference circle 41 on the presentation instrument and it is seen that the base 41 of the reference circle corresponds to the 21.8° angle illustrated in FIGURE 1. Thus the pilot may readily visualize the extent of his aircraft boundary in a conical fashion one thousand feet ahead and eight hundred feet in diameter and, in fact, the outer edge of a cone extended in this fashion actually coincides with the reference circle 41 drawn at 21.8° on the instrument of FIGURE 4. The pilot thus sees on the instrument of FIGURE 4 the imaginary base 41 of a cone extending one thousand feet from his aircraft with a half angle of 21.8°.

The intruding aircraft is represented in accordance with the present invention on the instrument of FIGURE 4 as a circle 43 whose size is a function of distance and which will appear at its true angle with respect to the heading of the aircraft. Since the size of the circle representing the intruding aircraft is to be a function of distance, it will, in accordance with visual perspective, grow bigger as it approaches and smaller as it recedes. By making the size of the intruder circle 43 equal to 21.8° when the intruding aircraft is two thousand feet away, the intruding aircraft dimensions are also imaginarily extended to the above-defined bicone. Thus if the intruder aircraft lies along the heading line of the pilot's aircraft and is two thousand feet distant, the circle 43 representing the intruder would be the same size as the reference circle 41 and would coincide with reference circle 41 on the face of the instrument. In accordance with the philosophy of the present invention, this particular presentation would represent a head-on collision of the cone bases 41 and 43 of the pilot's aircraft and intruder aircraft respectively. The two actual aircraft, however, would still be two thousand feet apart. The pilot's job would then be to prevent any "contact" of the two cone bases. If successful at all approach angles, this would always provide a two thousand feet miss distance. In case the approach is not head-on, the intruder circle 43 will appear at its true angle with respect to the heading of the pilot's aircraft and grow in size and change its angular position depending upon the approach situation. Thus with reference to FIGURE 4, the circle 43 represents an approaching aircraft down and to the left of the heading of the pilot's aircraft and at a distance greater than the two thousand feet safety margin.

Figure 3A:
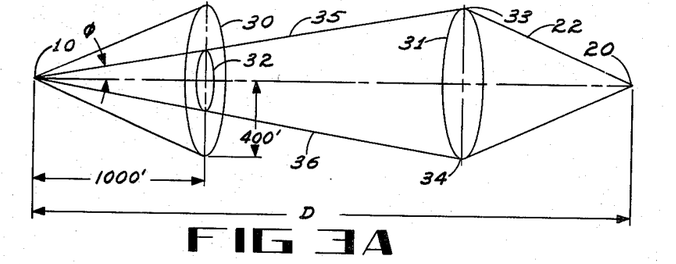
FIGURE 3(a) illustrates forwardly extending imaginary bicones of aircraft illustrating the approach geometry as concerns display information based upon true visual perspective.
Figure 3B:
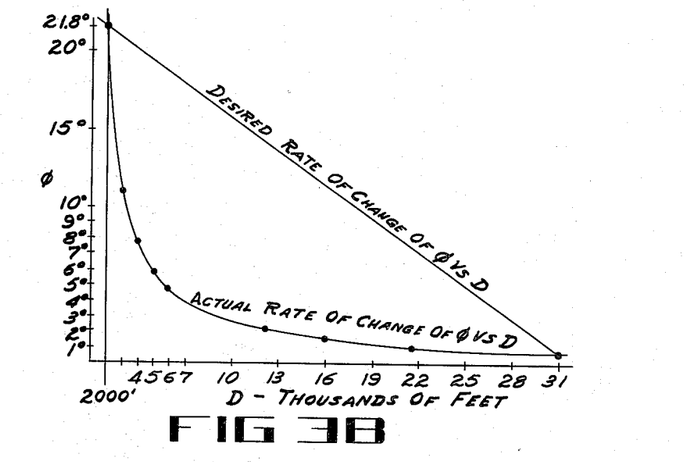
FIGURE 3(b) is a plot of the actual rate of change of the angle substended by the bicone base of an approaching aircraft as a function of distance, together with the desired linear rate of change according to the present invention.
Figure 3C:
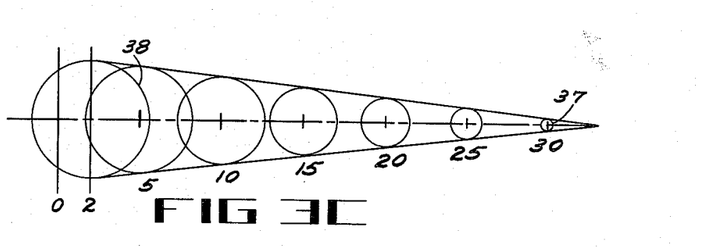
FIGURE 3(c) is an illustrated view of an arbitrarily preselected size of intruding aircraft circle representations versus distance according to the present invention.

The size of the intruder circle 43 is proportional to the distance between aircraft and the manner in which this size may be presented to enhance true visual perspective is illustrated in FIGURE 3. FIGURE 3(a) illustrates the approach geometry of the two aircraft with the imaginary cone dimensions described above. Thus, the pilot's aircraft might be at a point 10 and have its dimensions extended into a cone with a base circumference 30. The diameter of the base would be eight hundred feet. The intruding aircraft 20 has its dimensions extended similarly with a cone 22 of like dimensions and having a base circumference 31. The visual perspective to be considered may be seen by projecting the diametrically opposed points 33 and 34 on the base 31 of cone 22 to the point represented by aircraft 10. One might then visualize the pilot's eye as being at point 10 and we are here concerned with the angle subtended by the base 31 of the intruder cone as the points are projected towards the point 10. In accordance with the present invention, the subtended half angle will be the angle $\phi$ and the projection of the entire base 31 of the intruder aircraft cone 22 would form the circle 32 upon the base 30 of the cone extending from aircraft 10. It may be seen from the geometry of FIGURE 3(a) that should the bases of the two cones be superimposed the distance D will be two thousand feet and the half-angle $\phi$ subtended by the base 31 of the intruder aircraft will be the actual half-angle of the imaginary cones and $\phi$ will at this point be equal to 21.8°. In accordance with the presentation scheme of this invention, the intruder aircraft will be represented on the screen by the circle subtended on the cone base of the pilot's aircraft, that is the circle 32; and it may be seen that as the distance D increases the circle 32 subtended by the base 31 of the intruding aircraft 20 becomes smaller. True visual perspective, however, is not the desired situation since the circle 32 having the half angle $\phi$ of FIGURE 3(a) will not open linearly with variation in distance D, but will follow a tangent function. Thus, considering what the pilot actually sees, the intruding aircraft 20 would appear as a very small dot at great ranges and as the aircraft approached one another the intruder would not appear to grow in size appreciably until the distance D became quite small, at which time, the intruder aircraft would appear to "open up" rapidly. This is the tangent function referred to and it is illustrated in the graph of FIGURE 3(b). FIGURE 3(b) shows a plot of the half-angle $\phi$ subtended by the intruder aircraft cone base 31 as a function of the distance D between the two aircraft. The actual rate of change of $\phi$ as a function of D is seen to be a tangent function. The present invention incorporates means whereby the true visual perspective is altered such that the half-angle $\phi$ increases linearly as the distance decreases. Thus the desired rate of change of $\phi$ with respect to D is illustrated as a straight line in FIGURE 3(b). This straight line function may be accomplished readily by electronic means to be discussed further and a possible choice of circle sizes versus distance is illustrated in FIGURE 3(c) wherein the intruder circle opens up linearly with distance. Thus if thirty thousand feet were considered a minimum warning distance (twenty seconds at a closure velocity of fifteen hundred feet per second), the circle might be made to open up to an easily discernible circle 37 of approximately one-eighth inch in diameter. This is the reference circle 42 labelled "danger zone" on the instrument of FIGURE 4. From this size it can be made to increase linearly in diameter with decrease in the distance D such that at two thousand feet the circle 38 has a diameter equal to that of reference circle 41 shown on the instrument of FIGURE 4.

The above-discussed presentation scheme, while including means for improving the true visual perspective by incorporating a linear rate of change of the intruder circle, would still present a comparatively small intruder circle at long distances, that is distances exceeding, for example, thirty thousand feet or more. The circle at these great distances would not only be quite small, but appear relatively stationary on the presentation screen since the angular rate of change would be too small for radar type angular tracking. While change in distance could be resolved quite readily by the changing sizes of the circle, the rate of angular change would not become apparent until the intruder became quite close. In accordance with the present invention, therefore, a natural concept is applied. The pilot is given a pair of "electronic field glasses" by which he may study in more detail the motion of the target at long distances. These "electronic field glasses" are activated by a magnifier push button 47 on the display instrument shown in FIGURE 4. Electronic means will be further discussed by which the magnifier push button 47 may initiate magnification of the size of the intruder circle from a dot or a comparatively small circle to a relatively large circle. The pilot may then tell if the intruder is approaching or receding. Further means will be discussed by which, in addition to enlarging the intruder circle, modulation is superimposed on the circle which makes it appear doughnut shaped rather than a thin circle. The size of the "hole in the doughnut" might then indicate the angular rate of change in terms of a miss distance in feet. Basically, a very thin "doughnut" would represent very little angular rate of change and tell the pilot that he is on a possible collision course. The importance of the determination of angular rate of change at great distances is to be emphasized since it forewarns the pilot that unless he alters his present flight situation a collision is inevitable.

The electronic magnification principle, the details of which will be further discussed, is illustrated in FIGURE 12 wherein, for example, an intruder might appear as a small circle 201 and with the magnification feature would appear as a considerably larger circle 202. If no angular rate of change is present, the magnified circle 202 would have no modulation superimposed circumferentially thereon and would indicate a collision course though collision might not necessarily be imminent. If an angular rate of change did exist, the circle would "thicken" so that the circle might appear as circles 203, 204, and 205 wherein the dimension $X_2$ would be proportional to the amount of angular change. Thus circle 205 illustrates considerable rate of change, while circles 204 and 203 illustrate lesser degrees of angular rate of change respectively.

The system as it has been so far discussed is seen to provide a screen or instrument display which enables a pilot to observe the motion of an intruding aircraft and determine if a collision threat exists. If a collision threat does exist, the presentation provides sufficient information upon which the pilot may base a decision for an evasive maneuver.

In its most basic form, the system of the present invention must provide data on range and angle of the intruding aircraft on the display instrument. As previously discussed, the range data is to be presented as a circle whose diameter is proportional to distance. The position of the circle 43 on the screen of the display instrument 40 shown in FIGURE 4 presents the angle of the intruder relative to the heading of the aircraft. The data on range and angle may be provided by a search radar which locks on an intruding aircraft at a suitable distance.

Figure 5:
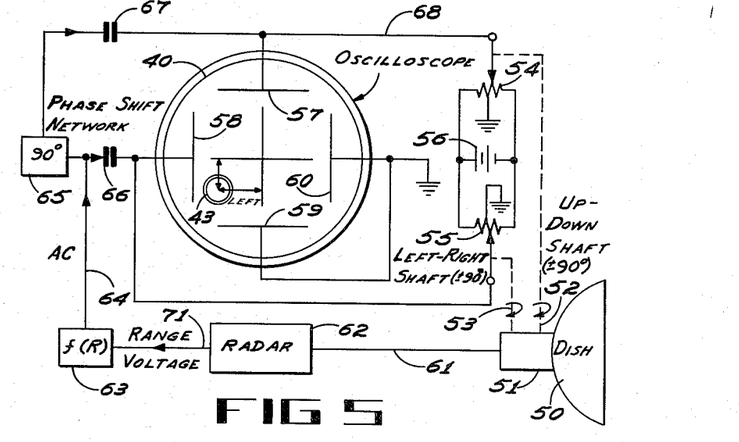
FIGURE 5 is a functional embodiment of a basic system according to the present invention.

FIGURE 5 illustrates an embodiment by which the basic system may be implemented. The display device 40 is illustrated as a cathode ray tube having horizontal deflection plates 58 and 60 and vertical deflection plates 57 and 59. The generation of the cathode ray beam is conventional and is not illustrated in detail. The beam position is controlled electrostatically by direct current voltages from potentiometers 54 and 55 on the gimbals of the radar antenna. Thus the radar antenna 50 is positionable by a drive mechanism 51 with the vertical gimbal of the dish positioning mechanism illustrated as shaft 52 and the horizontal gimbal illustrated as shaft 53. Potentiometers 54 and 55 are connected across a direct current voltage source 56. The potentiometers 54 and 55 are provided with grounded center taps and thus the wiper arms of each, depending upon their position, connect positive and negative voltages with respect to ground to the deflection plates of the oscilloscope. The wiper arm from the "up-down" potentiometer 54 is connected through conductor 68 to vertical deflection plate 57, while the wiper arm of the "left-right" potentiometer 55 is connected to horizontal deflection plate 58. By this conventional means, the cathode ray beam is deflected from its neutral center position into each of the four quadrants on the oscilloscope which correspond to the orientation of the radar beam relative to the true heading of the aircraft which is the center of the oscilloscope screen. The cathode ray tube beam then follows the angular position of the radar antenna 50 to indicate the intruder's angle with respect to the heading of the aircraft.

Radar antenna 50 is connected through connector 61 to radar transceiver 62. Radar transceiver 62 is of the conventional range and angle determining type wherein the radar antenna 50 may search out and lock on a target. A voltage proportional to range is taken from radar 62 through connector 71 and applied to an alternating current conversion circuit 63, designated $f(R)$, which converts the radar range voltage into an alternating current of proportional amplitude. The A.-C. voltage proportional to range is taken from conductor 64 through a capacitor 66 to horizontal deflection plate 68 and additionally through a 90° phase shifting network 65 and a capacitor 67 to vertical deflection plate 57. The resulting application of two A.-C. voltages of equal magnitude and 90-degree phase variation produces a circular sweep on the cathode ray screen in a manner well known in the art. In the present invention, a circular sweep is initiated wherein the diameter of the sweep circle is proportional to the magnitude of the A.-C. voltage applied and, since the A.-C. voltage amplitude is a function of range as obtained from radar 62, the diameter of the resultant circle is proportional to range.

The deflection system generated from the potentiometers 54 and 55 driven from the radar antenna gimbals positions the resultant circle on the screen in accordance with its relative position with respect to the heading of the aircraft. The $f(R)$ circuit 63 may be readily adapted to process the range voltage such that the circle size can be made to increase linearly as range decreases and further may be amplitude controlled such that a preselected circle size versus range relationship, such as illustrated in FIGURE 3(c), for example, may be realized. The desired circle size is calibrated in the example herein given such that at a range of two thousand feet between aircraft the circle size is coincident with the reference circle 41 on the screen of the presentation instrument.

Figure 13:
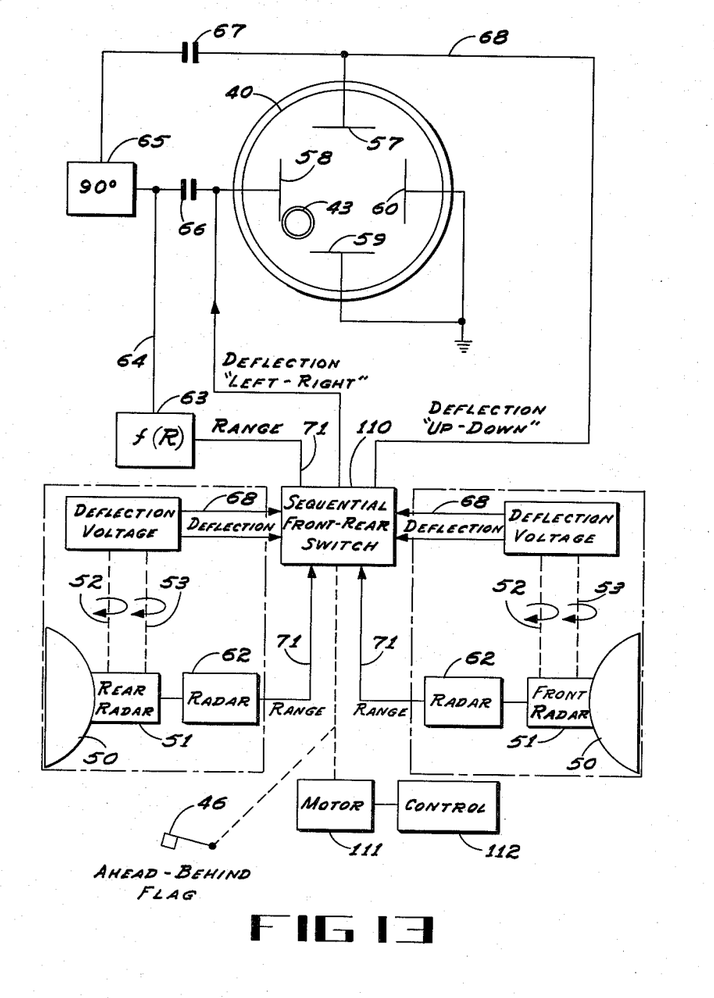
FIGURE 13 is a functional diagram of a basic system as in FIGURE 5 showing sequential front-rear switching according to the present invention.

In a system of the type herein proposed, it is essential that the radar "see" in all directions and thus the basic system of FIGURE 5 might be expanded to employ a plurality of radars each sequentially controlled so as to present target data on the oscilloscope screen on a time-sharing basis. An expansion of the basic system is illustrated in FIGURE 13 wherein front and rear radars are incorporated. Both the reflection voltages 68 and the range data 71 would be presented to the oscilloscope 40 through a sequential switch 110. In the embodiment illustrated in FIGURE 13, the sequential switch 110 would alternately apply deflection and range from the front and rear radars and might be driven by a motor 111 with associated control 112. With reference to the presentation instrument of FIGURE 4, the pilot is presented with an "ahead" view or a "behind" view in accordance with the control of the sequential front-rear switch 110. For this purpose, the motor control 112 might be adapted to continuously and sequentially present the front and rear hemisphere conditions at a predetermined rate or might be stopped for either presentation as desired. In any event, the "ahead-behind" flag 56 on the presentation instrument 15 controlled by the action of motor 111.

Figure 6:
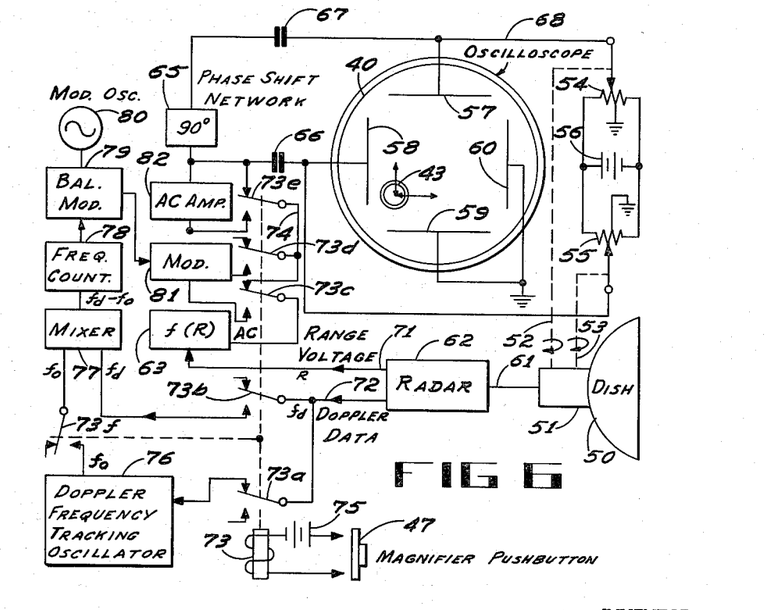
FIGURE 6 is a functional embodiment of a basic system including electronic magnification according to the present invention.

The basic system, as previously discussed, would present a comparatively small circle at long ranges of thirty thousand feet or more and the return would be relatively stationary since the angular rate of change of the target would be too small to resolve by conventional radar type tracking. For this reason, "electronic magnification" is employed as in the embodiment of FIGURE 6. The electronic magnification is initiated by a magnifier push button 47 by which the size of the circle and subsequently its rate of change in size is magnified. A further dimension is added to the circle to define the angular rate of change. The further dimension is that of thickness of the circle as previously discussed. The circuitry of FIGURE 6 enables the superimposition of a modulating voltage upon the circle, which voltage is a function of the angular rate of change between aircraft. With reference to FIGURE 6, wherein like elements are referenced as in FIGURE 5, range voltage data 71 from the radar 62 is normally applied as in the basic system to the $f(R)$ conversion circuit 63 and output from the $f(R)$ circuit 63 is applied through necessary switch connections and capacitor 66 to horizontal deflection plate 68 and through the 90° phase shifting network 65 and capacitor 67 to vertical deflection plate 57. The deflection system is illustrated as being identical to that of the basic system of FIGURE 5 and may in the more practical case incorporate the sequential switching of the embodiment of FIGURE 13. Magnifier push button 47, when depressed, completes the connection from direct current source 75 through the windings of a relay 73 to close a plurality of contacts by which electronic magnification and angular rate of change modulation is incorporated. The basic information on angular rate may be derived from Doppler information from the radar signal.

First, with respect to the magnification of the signal, the closing of the contacts on relay 73 places an alternating-current amplifier 82 into the circuitry by which the amplitude of the alternating-current signals which generate the circle sweep on the oscilloscope may be multiplied by a predetermined factor, such as, for example, ten times. Contacts 73e of relay 73 effect the insertion of alternating current amplifier 82. This magnification is realized only when the magnifier push button 47 is depressed and the resulting magnification is illustrated by circle 202 of FIGURE 12 as compared to the small circle 201 which is actually indicative of range at a comparatively large distance.

In order to provide a change in thickness of the circle to indicate angular rate of change or predicted miss distance, Doppler information from the radar 62 is utilized. Doppler frequency data from the radar 62 is taken from output 72 through normally closed contacts 73a of relay 73 to a Doppler frequency tracking oscillator 76. Thus, in the absence of electronic magnification, the Doppler frequency tracking oscillator 76 continually tracks the radar's Doppler frequency. Oscillator 76 may be of a conventional tracking type and need not be discussed in detail here. The rate of change of the Doppler frequency, $f_d$, is mathematically related to angular rate of change. With the operation of magnifier push button 47, the Doppler signal $f$, from the radar 62 is disconnected from the Doppler frequency tracking oscillator 76 through the opening of relay contact 73a. Oscillator 76 then ceases to track and "remembers" the Doppler frequency at the instant the magnifier push button 47 is operated. Contacts 73f of relay 73 then connect this "remembered Doppler frequency" $f_0$ to a mixer 77 and, simultaneously through relay contact 73b, the instantaneous Doppler frequency $f_d$ from the radar 62 is connected as a second input to the mixer 77. Mixer 77 subtracts the two Doppler frequencies and any difference $(f_d-f_0)$ is indicative of the angular rate of change that exists between the two aircraft. The output $(f_d-f_0)$ of mixer 77 is applied to a frequency counter 78 of the type whose output is a direct current signal of amplitude proportional to frequency. This type of counter is well known in the art and need not be described in detail here. The direct current signal from frequency counter 78 is applied to a balanced modulator 79 and will unbalance the unbalanced modulator only at times when a difference exists between the last remembered Doppler frequency $f_0$ from the frequency tracking oscillator 76 and the instantaneous Doppler frequency $f_d$ from radar 62. The balanced modulator 79 receives an input from a modulating oscillator 80 and produces an alternating current output signal only at times when a direct current signal is presented from frequency counter 78 which is indicative of a rate of change in Doppler frequency. The output of the balanced modulator 79 is then a function of the angular rate of change of the intruding aircraft. Any alternating current signal developed from balanced modulator 79 is applied to a modulator 81 which, through the closing of relay contacts 73c and 73d, is supplied with the alternating current signal developed in the $f(R)$ circuitry 63, which alternating current signal is of an amplitude indicative of radar range. Thus, the normal A.-C. voltages which develop the circular return on the oscilloscope screen with diameter proportional to range is modulated by modulator 81 in accordance with the rate of change of Doppler signal. This operation thickens the circle in a "doughnut-like" shape and the extent of the Doppler modulation is directly proportional to the angular rate of change of the intruding aircraft.

It is thus seen that with magnifier push button 47 in its normal position, the circular return on the oscilloscope 40 is that of a circle whose diameter is proportional to distance of the intruder and whose position is indicative of the angle of the intruder with respect to the heading of the viewing aircraft. When the magnifier push button is operated, relay action simultaneously initiates a magnification of the circle diameter and a circumferential modulation thereon which is proportional to the angular rate of change, if any, between aircraft.

Figures 7, 8:
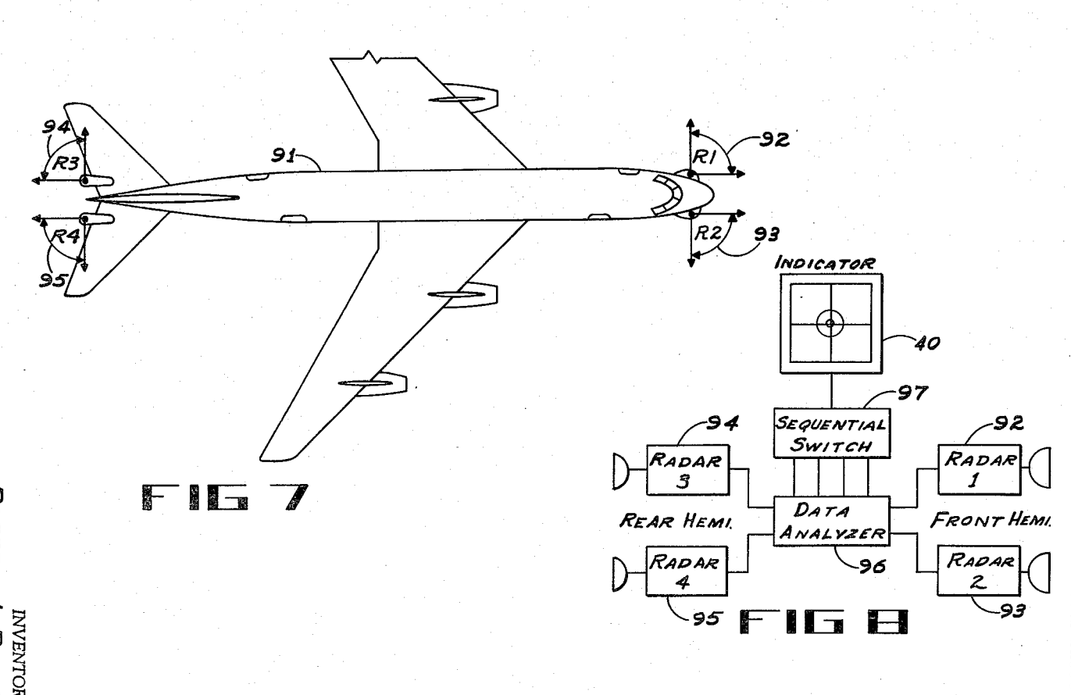
FIGURE 7 illustrates an aircraft with fore and aft antennas according to a complete system concept of the present invention.
FIGURE 8 is a block diagram of a complete system concept according to the present invention.

A complete system concept in accordance with the present invention might incorporate a plurality of radars along with sequential switching and data analyzing functions such that the sphere about the aircraft is judiciously scrutinized. FIGURE 13 illustrates an enlargement of the basic system of FIGURE 5 wherein a front and rear radar would be incorporated to sequentially present the forward and rear hemispheres. Four radars might be incorporated as in FIGURES 7 and 8, each scanning one-half of a hemisphere. With reference to FIGURE 7, four such radars are shown mounted on an aircraft 91 wherein forward radars 92 and 93 search the front hemisphere, while rear radars 94 and 95 search the rear hemisphere. Information from the four radars would be presented to the indicator 40 through a sequential switch 97 which would perform the function of presenting radar deflection and range data to the presentation system in a time-sharing manner from the plurality of four radar antennas. The use of four such radars would reduce the acquisition time and perhaps simplify the antenna scanning problem. Information from the radars might be first presented to a data analyzer 96 as shown in FIGURE 8 which would screen the aircraft present in the sphere and present output data to the sequential switch 97 only when an intruder presents a potentially dangerous situation. It is to be realized that the sequential switch would be controlled as illustrated in FIGURE 13 and would operate the ahead-behind flag 46 in an analogous manner.

Figure 9A:
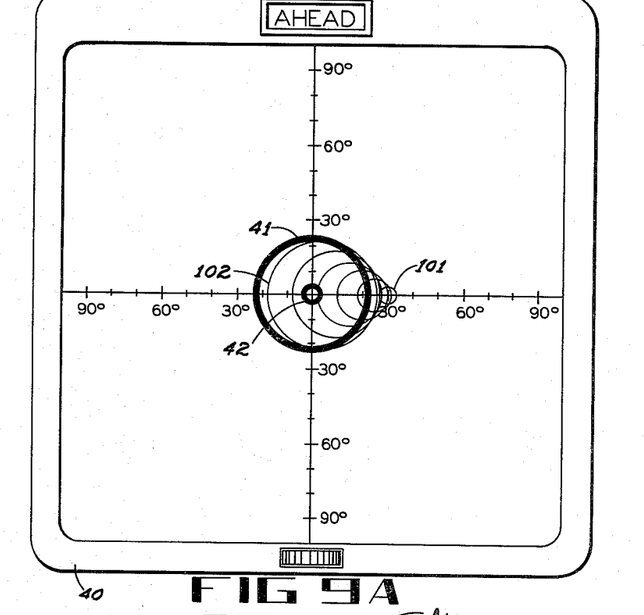
FIGURE 9(a) is a display resulting from a typical collision encounter situation according to the presentation scheme of the present invention.
Figure 9B:
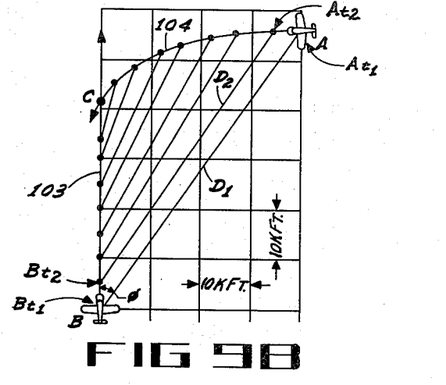
FIGURE 9(b) is a diagram of the encounter situation producing the presentation of FIGURE 9(a).
Figure 10A:
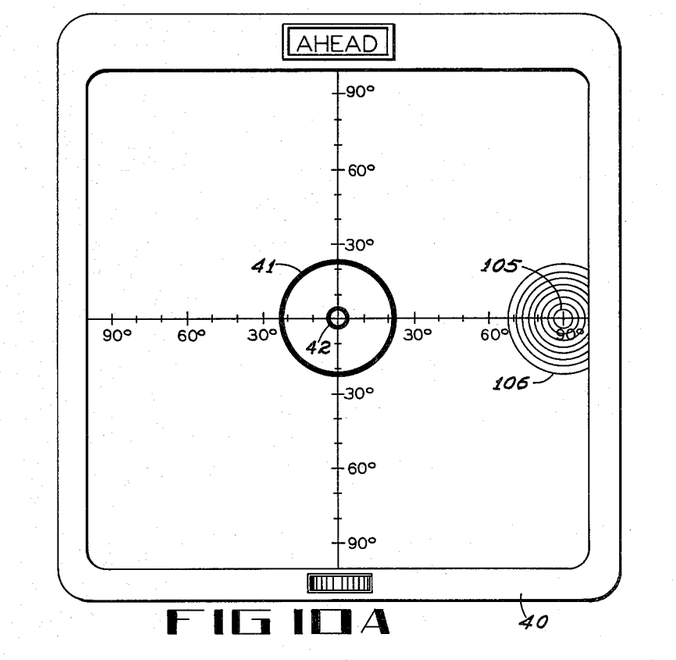
FIGURE 10(a) is an indicator presentation of another collision encounter situation.

The above-described system has been presented with emphasis on the philosophy of presenting a true visual representation of the encounter situation to the pilot. FIGURES 9, 10 and 11 illustrate typical encounter situations along with the resulting indicator presentation. With reference to FIGURE 9(b), the paths of two aircraft A and B are both plotted on a grid form wherein each square equals ten thousand feet. The successive positions of each aircraft with respect to time are indicated along their flight paths 103 and 104. Thus lines may be drawn between the successive positions and the distance between the aircraft at a given time and the angle of the intruding aircraft with respect to the heading of the pilot's aircraft may be determined such that encounter data may be obtained by graphical means. The circle size and the angle for each "intruder" aircraft position can be transferred to a drawing of the display instrument as in FIGURE 9(a) to illustrate how the position of the intruder aircraft on path 104 would appear to the pilot of aircraft B. FIGURE 9(b) illustrates a graphical flight situation showing a crossing collision between an aircraft B and an intruding aircraft A where the intruding aircraft A approaches from the right on a curved path. The aircraft A and B are illustrated at initial time positions $A_{t1}$ and $B_{t1}$ respectively. Subsequent aircraft positions are illustrated at $A_{t2}$ and $B_{t2}$ respectively. The distances between aircraft at these successive positions are illustrated as $D_1$ and $D_2$ respectively. The angle of the intruder aircraft A with respect to the pilot's aircraft B is illustrated as $\phi$. Thus by graphical means the distance $D_1$ may be converted to a circular return of corresponding diameter as in FIGURE 3(c) and angle $\phi$ may serve as the center of the circle for transfer of the flight situation to the indicator as it would appear to the pilot of aircraft B. The intruder aircraft A first appears at a distance $D_1$ of approximately thirty thousand feet as the circle 101 at an angle $\phi$ equal to 30—FIGURE 9(a). Subsequent distances and angles may then be transferred graphically and it is seen that the pilot of aircraft B sees the intruder aircraft A as a circle moving towards the center of the scope and increasing in diameter. As the intruder circle enlarges to circle 102, equal in diameter to reference circle 41, a 2,000-ft. distance between aircraft is realized and collision is imminent.

Figure 10B:
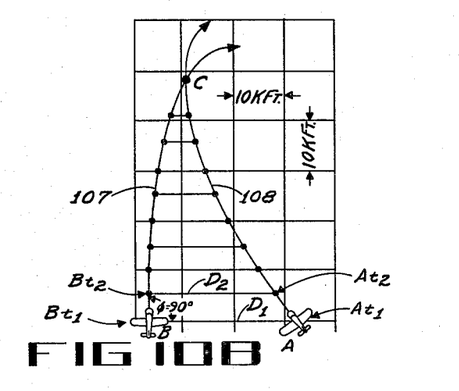
FIGURE 10(b) is a diagram of the encounter situation producing the presentation of FIGURE 10(a).
Figure 11A:
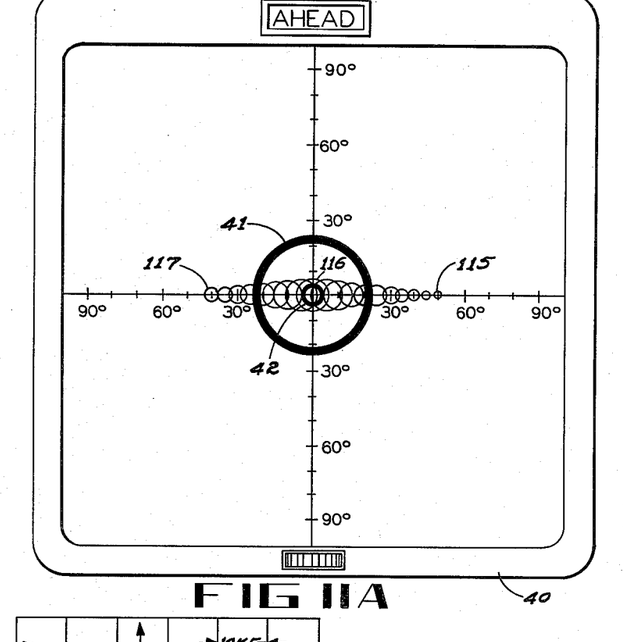
FIGURE 11(a) is an indicator presentation of an encounter wherein collision is not imminent.

FIGURE 10(b) illustrates still another collision situation showing an intruder aircraft A on course 108 overtaking the aircraft B on course 107 at a constant 90° angle from the right. In this situation, transference of the position data by the above discussed graphical means presents the scope picture shown in FIGURE 10(a). It is noted that the distance D between the aircraft decreases and thus, while the intruder aircraft A first appears at approximately thirty thousand feet as the circle 105 at 90° right, it does not change its angular position with respect to aircraft B, but continues to increase in diameter. Collision is imminent when the intruder circle reaches the size of circle 106, equal in diameter to the reference circle 41.

Figure 11B:
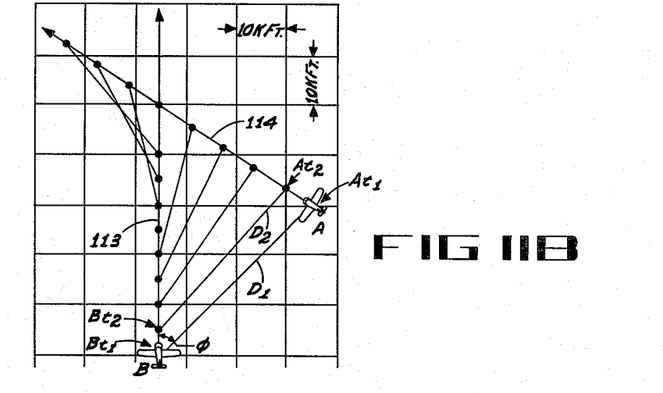
FIGURE 11(b) is a diagram of the encounter situation of FIGURE 11(a).

FIGURE 11(b) illustrates a further approach situation wherein collision is not imminent. Intruder aircraft A on course 114 is illustrated as being ahead and traveling faster than aircraft B on course 113. Aircraft A is thus on a crossing course, but passes safely ahead of aircraft B due to its higher speed. In this situation a similar graphical transfer of position and angle data presents the scope picture shown in FIGURE 11(a). The distances $D_1$, $D_2$, etc. between the aircraft is seen to increase and then decrease as the circle corresponding to intruder A starts on the right hand side of the screen at approximately 50° and "walks" across the screen at a relatively small size and disappears into the distance on the left-hand side of the screen. Intruder aircraft A is first illustrated at a distance $D_1$ of approximately 42,000 feet with an angle $\phi$ of 50° right. The corresponding small circle 115 is centered at 50° right. With subsequent positions, the distance reaches a minimum of approximately 25,000 feet (circle 116) when $\phi$ is approximately zero (the crossing of the course lines) and then increases as the intruder crosses to the left to a circle 117 corresponding to 30,000 feet at 40° left. The pilot of aircraft B then sees the intruder as a circle increasing slowly in size and crossing his course, but since the maximum size attained represents a considerable distance, and most importantly, since the angular position constantly changes, he is informed that there is no collision threat.

The above-discussed encounters indicate how the information is presented to a pilot. It is seen that the pilot is informed as to the relative position of the intruder, his distance, and more importantly, as to whether his angle is changing. The pilot must then be prepared to take evasive action should an intruder appear as a circle at a fixed angle and increase in size. He should further be prepared to take evasive action when the intruder circle changes angularly and increases in diameter to where a collision with the reference circle 41 is imminent.

It is thus seen that the collision avoidance system of the present invention provides radar detection to enable the pilot to see in all directions; employs a circle of varying diameter to represent the range of an intruder to enable the pilot to see whether the intruder is approaching or receding; provides a visual presentation by which the rate of approach of an intruder may be observed by change of size of the circle; presents the true angle of the intruder by the position of the circle on the screen; presents angular rate of change both at a normal rate and a magnified rate; and provides a means whereby the pilot may constantly not only observe a situation calling for evasive action, but may constantly and instantaneously observe the effect of his subsequent evasive action. The invention thus provides a collision avoidance system which enhances the pilot's visual senses and provides him with a continual picture of what is occurring.

Although this invention has been described with respect to particular embodiments thereof, it is not to be so limited as changes and modifications may be made therein which are within the full intended scope of the invention as defined by the appended claims.

I claim:

1. An aircraft collision warning presentation system comprising radar means, said radar means adapted to provide target distance and bearing data with respect to said aircraft, a cathode ray oscilloscope including means for generating a cathode ray beam and horizontal and vertical deflection plates for the position control of said beam, means converting the radar bearing data to a deflection voltage, said voltage coupled to said deflection plates, alternating current conversion means, said alternating current conversion means receiving range data from said radar and adapted to provide an alternating current output with amplitude inversely proportional to said radar range, phase shifting means, the output from said alternating current conversion means applied to said phase shifting means, coupling means connecting the output from said phase shifting means to one of said deflection plates, the output from said alternating current conversion means additionally applied directly through coupling means to the other set of said deflection plates whereby radar range and bearing data are converted to a circular presentation on said oscilloscope with diameter inversely proportional to said radar range and displaced from the center of said oscilloscope in accordance with said radar bearing data by a degree and sense indicative of the orientation of said radar means with respect to the axes of said aircraft, a reference circle of predetermined diameter fixed concentrically about the center of said oscilloscope, said predetermined diameter corresponding to a preselected minimum safe range between said target and said aircraft, the avoidance of which assures a predetermined miss distance between said aircraft and said target.

2. An aircraft collision warning presentation system comprising a plurality of radar means each with associated antenna and adapted to collectively search a sphere about said aircraft, switching means, range and bearing output data from each of said radar means connected to said switching means, an oscilloscope, alternating current conversion means, said switching means adapted to selectively connect preselected ones of said radar output data to said alternating current conversion means and the deflection plates of said oscilloscope respectively, said alternating current conversion means adapted to provide an alternating current output with amplitude inversely proportional to said radar range data, phase shifting means, the output from said alternating current conversion circuit applied to said phase shifting means, means coupling the output from said phase shifting means to one of said oscilloscope deflection plates, the output from said alternating current conversion circuit additionally applied directly through coupling means to the other of said oscilloscope deflection plates whereby radar data is converted to a circular presentation on said oscilloscope with diameter inversely proportional to said radar range and centered at a point indicative of the orientation of an associated radar antenna with respect to the axes of said aircraft, a reference circle of predetermined diameter fixed concentrically about the center of said oscilloscope, said predetermined diameter corresponding to a preselected minimum safe range between said target and said aircraft, the avoidance of which assures a predetermined miss distance betwen said aircraft and said target.

3. An aircraft collision warning presentation system comprising radar means adapted to develop a voltage output proportional to target range, a cathode ray oscilloscope including first and second pairs of beam deflection plates, means affecting deflection of said cathode ray beam in accordance with the angular orientation of said radar means with respect to the axes of said aircraft, a reference circle fixed concentrically about the center of the face of said oscilloscope and having a diameter corresponding to the base of a conical extension of the dimensions of said aircraft as a cone of predetermined height and base diameter, means for presenting said range data on said oscilloscope as a circle of diameter proportional to said radar range and centered about a point on said oscilloscope in accordance with the radar orientation with respect to the axes of said aircraft, said last-mentioned means comprising means for converting said radar range data to an alternating current voltage with amplitude inversely proportional to said radar range, phase shifting means receiving the output from said alternating current conversion means, the output of said phase shifting means coupled to said first pair of said deflection plates, the output from said alternating current conversion circuit additionally coupled directly to the other pair of said deflection plates, said alternating current conversion circuit having a preselected amplitude characteristic inversely proportional to radar range such that a target range twice the preselected height of the aforementioned conical extension of said aircraft dimensions is presented as a circle with diameter equal that of said reference circle.

4. An aircraft collision warning presentation system comprising a plurality of radar means each with associated antenna and scanning system and adapted to collectively search a sphere about said aircraft, switching means, range and bearing outputs from each of said radar means connected to said switching means, an oscilloscope, a reference circle fixed concentrically about the center of the face of said osilloscope and having a diameter corresponding to the base of a conical extension of the dimensions of said aircraft as a cone of predetermined height and base diameter, presentation means for presenting radar range and bearing data as a circular representation on said oscilloscope with diameter inversely proportional to said range and centered about a point on said oscilloscope in accordance with the radar bearing data, said switching means adapted to selectively connect preselected ones of said radar outputs to said presentation means, said presentation means comprising means for converting radar range data to an alternating current voltage with amplitude inversely proportional to said radar range, phase shifting means receiving the output from said alternating current conversion circuit, the output from said phase shifting means coupled to a first set of deflection plates for said oscilloscope, the output from said alternating current conversion means additionally directly coupled to a second set of deflection plates for said oscilloscope, said alternating current conversion circuit having a preselected amplitude characteristic inversely proportional to said radar range data such that a target at a range twice the preselected height of the aforementioned conical extension of said aircraft dimensions is presented as a circle with diameter equal that of said reference circle, means for selectively operating said switching means, and means operatively connected with said switch control means for indicating which of preselected ones of said plurality of scanning systems is selectively connected for display on said oscilloscope.

5. An aircraft collision warning presentation system comprising radar means adapted to develop a voltage output proportional to target range, a cathode ray oscilloscope including first and second pairs of beam deflection plates, means affecting deflection of said cathode ray beam in accordance with the angular orientation of said radar means with respect to the axes of said aircraft, a reference circle fixed concentrically about the center of the face of said oscilloscope and having a diameter corresponding to the base of a conical extension of the dimensions of said aircraft as a cone of predetermined height and base diameter, presentation means for presenting said range data on said oscilloscope as a circle with diameter proportional to said range and centered about a point on said oscilloscope in accordance with the antenna orientation with respect to the axes of said aircraft, said presentation means comprising means for converting said radar range data to an alternating current voltage with amplitude inversely proportional to said radar range, phase shifting means adapted to receiving the output from said alternating current conversion means, the output of said phase shifting means coupled to said first pair of deflection plates, the output from said alternating current conversion circuit additionally coupled directly to the second pair of deflection plates, said alternating current conversion circuit having a preselected amplitude characteristic inversely proportional to radar range such that a target range twice the preselected height of the aforementioned conical extension of said aircraft dimensions is presented as a circle with diameter equal that of said reference circle, a magnifier control, an alternating current amplifier, the output from said alternating current conversion circuit selectively connected through said alternating current amplifier to said phase shifting means by operation of said magnifier control whereby the preselected circle presentation characteristic of radar range may be selectively enlarged by a preselected amplification factor.

6. An aircraft collision warning presentation system comprising radar means, said radar means adapted to provide target distance and bearing data with respect to said aircraft and the Doppler beat frequency between transmitted and reflected signals, a cathode ray oscilloscope including means for generating a cathode ray beam and first and second pairs of deflection plates for the position control of said beam, means converting the radar bearing data to a deflection voltage, said deflection voltage coupled to said deflection plates, first signal conversion means receiving range data from said radar and adapted to provide a first alternating current signal with amplitude inversely proportional to said radar range, second signal conversion means receiving the Doppler frequency from said radar and adapted to convert said doppler frequency to a second alternating current signal of amplitude proportional to the change in Doppler frequency from a predetermined reference, modulating means receiving the outputs from said first and second signal conversion means and amplitude modulating said first alternating current signal with said second alternating current signal, phase shifting means, the output from said modulating means connected to said phase shifting means, coupling means connecting the output from said phase shifting means to said first pair of deflection plates, the output from said first signal conversion means additionally applied directly through coupling means to the second pair of said deflection plates whereby radar range and bearing data are converted to a circular presentation on said oscilloscope with diameter inversely proportional to said radar range and displaced from the center of said oscilloscope in accordance with said radar bearing data.

7. An aircraft collision warning presentation system comprising radar means adapted to develop a voltage output proportional to target range and the Doppler beat frequency between transmitted and reflected signals, a cathode ray oscilloscope including first and second pairs of beam deflection plates, means affecting deflection of said cathode ray beam in accordance with the angular orientation of said radar means with respect to the axes of said aircraft, a reference circle fixed concentrically about the center of the face of said oscilloscope and having a diameter corresponding to the base of a conical extension of the dimensions of said aircraft as a cone of predetermined height and base diameter, presentation means for presenting said range data on said oscilloscope as a circle of diameter proportional to said range and centered about a point on said oscilloscope in accordance with the antenna orientation with respect to the axes of said aircraft, said presentation means comprising first signal conversion means for converting said radar range data to a first alternating current voltage with amplitude inversely proportional to said radar range, second signal conversion means receiving the Doppler beat frequency from said radar and adapted to convert said Doppler frequency to a second alternating current signal of amplitude proportional to the change in Doppler frequency from a predetermined reference, modulating means receiving the outputs from said first and second signal conversion means and amplitude modulating said first alternating current signal with the said second alternating current signal, phase shifting means adapted to receive the output from said modulating means, the output of said phase shifting means coupled to said first pair of deflection plates, the output from said first signal conversion circuit additionally coupled directly to the second pair of said deflection plates, said first signal conversion means having a preselected amplitude characteristic inversely proportional to radar range such that a target range twice the preselected height of the aforementioned conical extension of said aircraft dimensions is presented as a circle of diameter equal that of said reference circle.

8. An aircraft collision warning presentation system comprising radar means adapted to develop a voltage output proportional to target range and providing the Doppler beat frequency between transmitted and target reflected signals, a cathode ray oscilloscope including first and second pairs of beam deflection plates, means affecting deflection of said cathode ray beam in accordance with the angular orientation of said radar means with respect to the axes of said aircraft, a reference circle fixed concentrically about the center of the face of said oscilloscope and having a diameter corresponding to the base of a conical extension of the dimensions of said aircraft as a cone of predetermined height and base diameter, presentation means for presenting said radar range data on said oscilloscope as a circle with diameter proportional to said range and centered about a point on said oscilloscope in accordance with the radar orientation with respect to the axes of said aircraft, said presentation means comprising first signal conversion means for converting said radar range data to a first alternating current voltage with amplitude inversely proportional to said radar range, second signal conversion means receiving the Doppler beat frequency from said radar means and adapted to convert said Doppler frequency to a second alternating current signal with amplitude proportional to the change in Doppler frequency from a predetermined reference, modulating means receiving said second alternating current signal, switching means, said first alternating current signal connected through a first position of said switching means to said modulating means, said modulating means amplitude modulating said first alternating current signal with said second alternating current signal, an alternating current amplifier, the output from said modulating means connected through said first position of said switching means to said alternating current amplifier, said first alternating current signal connected directly to the output of said alternating current amplifier through a second position of said switching means, phase shifting means, the output of said alternating current amplifier connected through said phase shifting means to said first pair of deflection plates, the output of said alternating current amplifier additionally connected directly through coupling means to said second pair of deflection plates, said first signal conversion means having a preselected amplitude characteristic inversely proportional to radar range such that a target at a range twice the preselected height of the aforementioned conical extension of said aircraft dimensions is presented as a circle with diameter equal that of said reference circle, means controlling said switching means whereby the preselected circle presentation characteristic of radar range may be selectively enlarged by a preselected amplification factor and additionally be simultaneously amplitude modulated by a percentage proportional to the change in Doppler frequency from the instant said switch controlling means initiates said first switch position.

9. An aircraft collision warning persentation system comprising radar means adapted to develop a voltage output proportional to target range and providing the Doppler beat frequency between transmitted and target reflected signals, a cathode ray oscilloscope including first and second pairs of beam deflection plates, means affecting deflection of said cathode ray beam in accordance with the angular orientation of said radar means with respect to the axes of said aircraft, a reference circle fixed concentrically about the center of the face of said oscilloscope and having a diameter corresponding to the base of a conical extension of the dimensions of said aircraft as a cone of predetermined height and base diameter, presentation means for presenting said radar range data on said oscilloscope as a circle with diameter proportional to said range and centered about a point on said oscilloscope in accordance with the radar orientation with respect to the axes of said aircraft; said presentation means comprising first signal conversion means for converting said radar range data to a first alternating current voltage with amplitude inversely proportional to said radar range; second signal conversion means comprising means for continuously tracking said Doppler beat frequency, switching means, a first position on said switching means adapted to interrupt said tracking and simultaneously apply the Doppler beat frequency from said radar and the Doppler tracking signal to mixing means, modulating means, the output of said first signal conversion means connected to said modulating means, the output from said mixing means connected to a balanced modulator, the output from said balanced modulator applied to said modulating means to amplitude modulate the alternating current signal from said first signal conversion means at a predetermined alternating current rate and with a percentage modulation proportional to the frequency output from said mixing means, phase shifting means, the output from said modulating means applied through said phase shifting means to said first pair of deflection plates and directly through coupling means to the second pair of deflection plates, said first signal conversion means having a preselected amplitude characteristic inversely proportional to radar range such that a target at a range twice the preselected height of the aforementioned conical extension of said aircraft dimensions is presented as a circle with diameter equal that of said reference circle, means controlling said switching means whereby the preselected circle presentation characteristic of radar range may be amplitude modulated at a rate proportional to the change in said Doppler frequency from the instant said switching means interrupts said Doppler frequency tracking means.

10. An aircraft collision warning presentation system comprising radar means adapted to develop a voltge output proportional to target range and provide the Doppler beat frequency between transmitted and target reflected signals, a cathode ray oscilloscope including first and second pairs of beam deflection plates, means affecting deflection of said cathode ray beam in accordance with the angular orientation of said radar means with respect to the axes of said aircraft, a reference circle fixed concentrically about the center of the face of said oscilloscope and having a diameter corresponding to the base of a conical extension of the dimensions of said aircraft as a cone of predetermined height and base diameter, presentation means for presenting said radar range data on said oscilloscope as a circle with diameter proportional to said range and centered about a point on said oscilloscope in accordance with the radar orientation with respect to the axes of said aircraft, said presentation means comprising first signal conversion means for converting said radar range data to a first alternating current voltage with amplitude inversely proportional to said radar range, a Doppler frequency tracking oscillator, switching means, the Doppler frequency from said radar connected through said switching means to said Doppler frequency tracking oscillator, the output from said tracking oscillator connected thorugh said switching means to a mixer, the Doppler frequency from said radar connected through said switching means to said mixer, the output from said mixer connected to a frequency counter, said frequency counter adapted to produce a direct current output with amplitude proportional to the frequency output from said mixer, the output from said frequency counter connected to a balanced modulator, a modulating oscillator having a preselected frequency greater than that of said first alternating current signal, the output from said modulating oscillator connected to said balanced modulator, said balanced modulator adapted to produce an output at the frequency of said modulating oscillator with amplitude proportional to the output from said frequency counter, a second modulator, the output from said balanced modulator connected to said second modulator, the output from said first signal conversion means connected through said switching means to said second modulator, said second modulator amplitude modulating the output from said first signal conversion means at a rate determined by said modulating oscillator frequency and with a percentage modulation proportional to the output from said frequency counter, the output from said second modulator connected through said switching means to an alternating current amplifier, phase shifting means, the output from said alternating current amplifier connected through said phase shifting means to said first pair of deflection plates, the output from said alternating current amplifier additionally connected through coupling means to said second pair of deflection plates, said first signal conversion means having a preselected amplitude characteristic inversely proportional to radar range such that a target range twice the preselected range of the aforementioned conical extension of said aircraft dimensions is presented as a circle with diameter equal that of said reference circle, control means for affecting first and second positions of said switching means, the first position of said switching means connecting said second alternating current voltage to the output terminal of said alternating current amplifier and the Doppler frequency to said tracking oscillator while removing the inputs to said mixer, the second position of said switching means connecting said first alternating current signals to said second modulator and said second modulator to said alternating current amplifier, said second position additionally connecting said Doppler frequency tracking oscillator and said Doppler beat frequency from said radar to said mixer while disconnecting said Doppler beat frequency from said tracking oscillator whereby the preselected circle presentation characteristic of radar range may be selectively enlarged by a preselected amplification factor and simultaneously be amplitude modulated at a rate proportional to the change in said Doppler frequency from the instant said switch controlling means affects the second position of said switching means.

References Cited in the file of this patent

UNITED STATES PATENTS 2,416,591    Muntz  ---------------- Feb. 25, 1947